(12) United States Patent
Leighton

(10) Patent No.: US 6,290,795 B1
(45) Date of Patent: Sep. 18, 2001

(54) SPLICING UNIT AND METHOD OF SPLICING

(76) Inventor: Murray Edward Bruce Leighton, c/o Supreme Plastics Limited, Stainsacre Lane, Whitby, North Yorkshire YO22 4PT (GB)

(*) Notice: Subject to any disclaimer, the term of this patent is extended or adjusted under 35 U.S.C. 154(b) by 0 days.

(21) Appl. No.: 09/297,763

(22) PCT Filed: Sep. 10, 1998

(86) PCT No.: PCT/GB98/02741

§ 371 Date: Jun. 4, 1999

§ 102(e) Date: Jun. 4, 1999

(87) PCT Pub. No.: WO99/12725

PCT Pub. Date: Mar. 18, 1999

(30) Foreign Application Priority Data

Sep. 10, 1997 (GB) .................................................. 9719104

(51) Int. Cl.[7] ............................. A44B 19/16; B65H 69/06
(52) U.S. Cl. ................... 156/157; 156/304.1; 156/304.5; 156/304.6; 383/63; 24/399

(58) Field of Search ................................. 156/157, 304.2, 156/304.3, 304.5, 304.6, 304.1; 383/63; 24/399, 587

(56) References Cited

U.S. PATENT DOCUMENTS

| 5,152,613 | * | 10/1992 | Herrington, Jr. ........................ 383/63 |
| 5,599,415 | * | 2/1997 | Tomic et al. .......................... 156/159 |
| 5,690,769 | * | 11/1997 | Daigle et al. .......................... 156/158 |

* cited by examiner

Primary Examiner—Richard Crispino
Assistant Examiner—Sue A. Purvis
(74) Attorney, Agent, or Firm—Young & Thompson

(57) ABSTRACT

In the manufacture of plastics bags using reclosable zipper strip (10,14) with engageable male and female profiles (12,16), a butt splicing operation is used to speed up the changeover from one reel of zipper strip to another. The trailing end of one strip and the leading end of the next strip are brought together in abutting relationship within a splicing unit, sealing material (22) is overlaid on the end zones of opposite sides of the strips, and this is sealed to the underlying zipper strips, preferably using heat and pressure. The flanges (18) of the zipper strips are held apart by separator plates (20) during the sealing operation.

8 Claims, 1 Drawing Sheet

US 6,290,795 B1

SPLICING UNIT AND METHOD OF SPLICING

CROSS REFERENCE TO RELATED APPLICATION

This is the 35 USC 371 national stage of International application PCT/GB98/02741 filed on Sep. 10, 1998, which designated the United States of America.

FIELD OF THE INVENTION

This invention relates to a splicing unit for connecting together the ends of two lengths of plastics zipper such as is used for reclosable plastics bags and the like. The invention is also concerned with a method of splicing together, i.e. connecting, two ends of such zipper material.

BACKGROUND OF THE INVENTION

In the manufacture of plastics bags using reclosable fasteners the zipper which is used and which carries male and female profiles is wound on reels, from which it is unwound for guidance towards the bag-making apparatus. Currently, when a reel of zipper is exhausted, it is necessary to switch over to another reel. This can be a time-consuming operation, requiring the new zipper to be correctly fed into and established within the bag-making apparatus.

SUMMARY OF THE INVENTION

It is an object of the present invention to speed up the changeover operation from one length of zipper to another when changing reels.

In accordance with the present invention there is provided a method of connecting two lengths of zipper material, each length comprising two interengageable parts, and each part comprising a base carrying respective male and female profiles, the method comprising the steps of bringing the trailing end of one length and the leading end of the other length into abutting relationship with the male and female profiles engaged, bridging end zones of the respective lengths with sealing material, and sealing the bridging material to the lengths of zipper material to effect a connection therebetween.

Preferably, each base has flanges on each side of the male/female profiles, and the sealing material is laid over the end zones with the respective flanges maintained separated.

Preferably, the heat-sealing material is overlaid on the outside surface of both bases and a heat sealing operation is carried out on both surfaces simultaneously.

Also in accordance with the present invention there is provided an apparatus for connecting two lengths of zipper material, each length comprising two interengageable parts, and each part comprising a base carrying respective male and female profiles, the apparatus comprising means to hold the lengths of zipper material in abutting end-to-end relationship with the male and female profiles engaged, means to apply sealing material to the end zones of the lengths to bridge the lengths, and sealing means arranged to effect sealing of the sealing material to the bases to connect the lengths together.

Preferably, each base has flanges on each side of the male/female profiles, and separating means are provided for entry between the opposing flanges to maintain the flanges apart during the sealing process.

Preferably, the separating means comprises dividing plates which divide the flanges of the zipper prior to the sealing treatment, in order to prevent the flanges from being sealed one to another when the sealing operation is carried out, for example by heating.

The connection of the two lengths of zipper in accordance with the invention is essentially a butt splicing operation.

BRIEF DESCRIPTION OF THE DRAWINGS

In order that the invention may be more fully understood, one presently preferred embodiment in accordance with the invention will now be described by way of example and with reference to the accompanying drawing.

In the drawing.

DETAILED DESCRIPTION OF THE INVENTION

Figure 1:
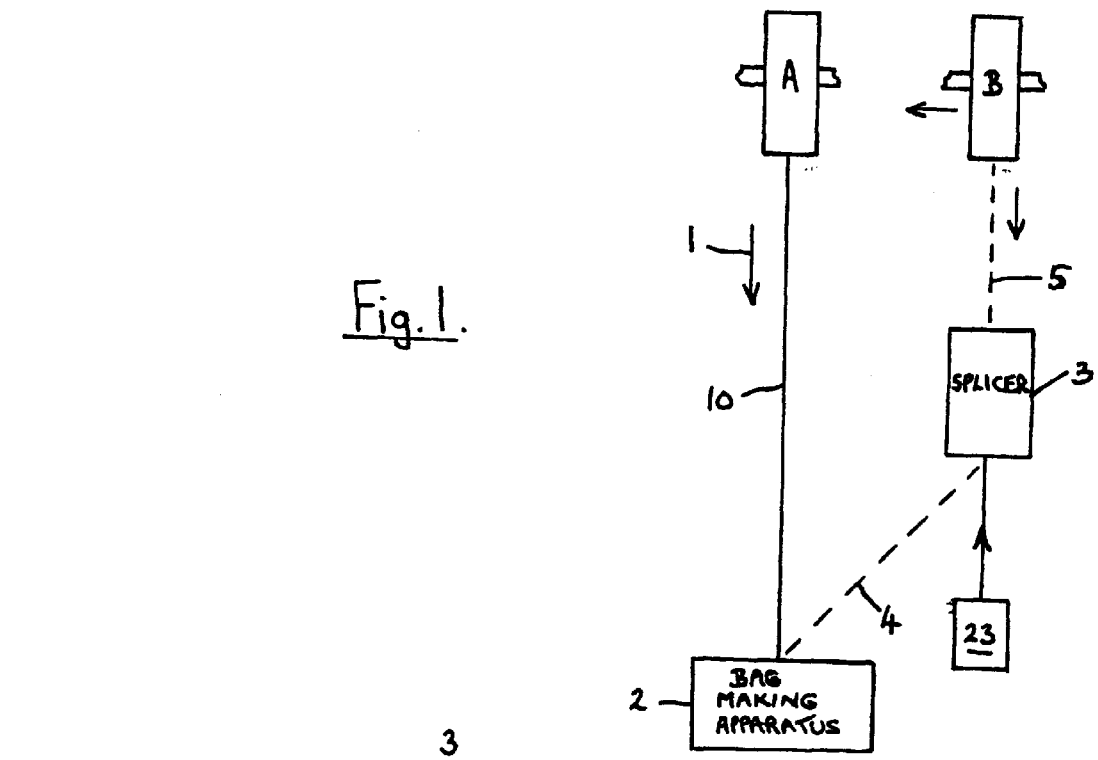
FIG. 1 is a schematic diagram of the overall zipper supply system.

FIG. 1 shows a first reel A wound with zipper strip 10 which traverses a path indicated by arrow 1 to a bag-making apparatus indicated generally at 2. A second reel B wound with zipper strip is mounted adjacent to reel A. In the space between the reels A, B and the bag-making apparatus is positioned a splicing unit indicated generally at 3. When the zipper strip 10 on reel A is almost exhausted, the zipper strip is severed and the trailing end indicated by the broken line 4 is fed into the splicing unit 3. The leading end of the zipper strip on reel B, indicated by the broken line 5, is also fed into the splicing unit 3, where a splicing operation is then performed as will be described in more detail hereinafter. Thereafter, the connected zipper is removed from the splicing unit 3 and the new reel B can be moved to replace the previous reel A, with the zipper resuming its path 1. The splicing unit 3 can either occupy a fixed position or be movable as a whole from a standby position to an operating position as and when required.

Figure 2:
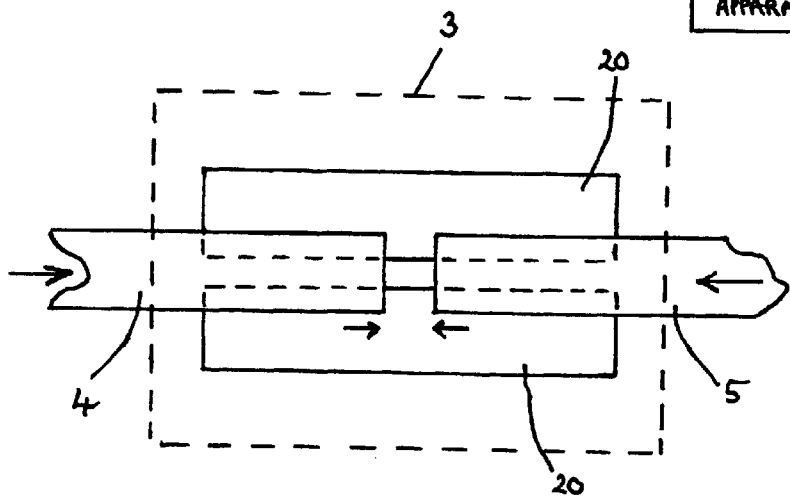
FIG. 2 shows the ends of two zipper strips being brought into butting engagement within a splicing unit.
Figure 3:
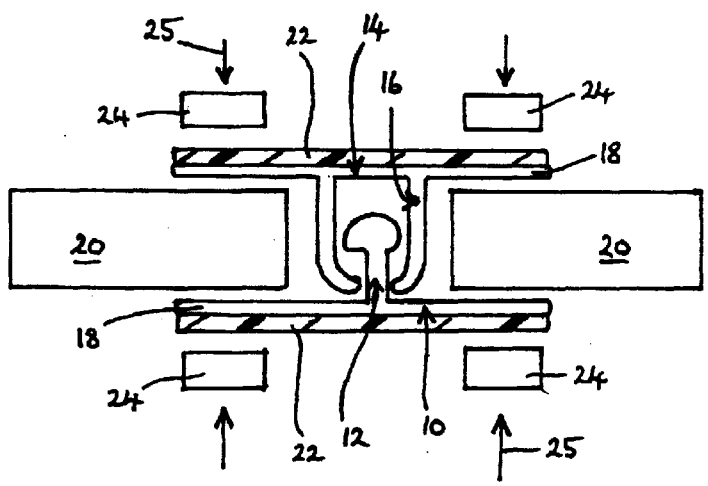
FIG. 3 is a sectional view through the splicing unit showing schematically how the heat sealing operation is carried out.

FIG. 2 shows the trailing zipper end 4 and the leading zipper end 5 which, as indicated by the arrows, are brought into abutting engagement at their ends within the splicing unit 3 for connection of one to the other. As shown in FIG. 3, each zipper strip comprises two interengaged parts, a first base 10 which carries a male profile 12 and a second base 14 which carries a female profile 16. The portions 10, 12 of the zipper each have lateral flanges 18 to each side of the profiles.

The splicing unit 3 comprises a pair of separating plates 20 which serve to part the flanges 18 of the zipper and to prevent the inside faces of these flanges from coming into engagement. The separating plates 20 can be made of steel, "Teflon", etc., or indeed can be any heat-resistant semi-rigid or rigid structure which will perform the required separating function. The separating plates 20 can be static or can be movable into and out of the path of the zipper.

The adjacent ends of the two zippers, i.e. the trailing end 4 of the first zipper and the leading end 5 of the second zipper, are brought into abutment with each other within the zone of the separating plates 20 and are then overlaid on both sides with a heat-sealing material 22, preferably a plastics material. FIG. 1 shows a dispenser 23 from which this material is supplied to both faces of the zipper. A heat sealing operation is then performed on both sides of the zipper material, as indicated schematically by the sealing units 24. Some or all of these units 24 are movable reciprocally towards and away from the zipper overlaid with the heat-sealing material, as indicated by arrows 25, and by the application of appropriate temperatures and pressure for a suitable time effect a sealing of the heat-sealing material 22 to the underlying flanges 18 of the respective zippers, thereby to effect a splicing of the two lengths of zipper. The plates 20 serve as a support during the pressure/heat-sealing operation.

Any suitable heat sealing device can be used, with variation of the time, temperature and pressure to meet with circumstances of the particular materials involved. One suitable heat-sealing material is LDPE (low-density polyethylene).

Although it is easier from a manufacturing point of view to overlay the full width of each zipper end with the heat-sealing material 22, one could alternatively lay strips of such material over the flanges only of the zippers to provide the splicing link between the two lengths. Also, although reference has been made above to the use of heat for the sealing of the overlaid material 22 to the zipper flanges 18, any alternative procedure for fixing one to the other could be used, for example adhesives or ultrasonics. However, heat sealing is preferred.

The method and apparatus of the present invention provide a simple yet reliable way of connecting two lengths of zipper material together in a way which minimises the time required to change from one reel to another.

What is claimed is:

1. A method of connecting two lengths of zipper material, each length comprising two interengageable parts, and each part comprising a base carrying respective male and female profiles, the method comprising the steps of bringing the trailing end of one length and the leading end of the other length into abutting relationship with no overlap, where the male and female profiles engaged, bridging end zones of the respective lengths with sealing material, and sealing the bridging material to the lengths of zipper material to effect a connection therebetween.

2. A method as claimed in claim 1, in which each base has flanges on each side of the male/female profiles, and the sealing material is laid over the end zones with the respective flanges maintained separated.

3. A method as claimed in claim 2, which comprises introducing separating plates between the flanges on each side of the profiles.

4. A method as claimed in claim 2, which comprises sealing the sealing material to the bases only in the region of the flanges.

5. A method as claimed in claim 1, in which the sealing material is heat-sealing material.

6. A method as claimed in claim 5, in which the heat-sealing material is overlaid on the outside surface of both bases and a heat sealing operation is carried out on both surfaces simultaneously.

7. A method as claimed in claim 1, in which the sealing includes the application of pressure to the sealing material.

8. A method as claimed in claim 1, in which the sealing material is low-density polyethylene.

* * * * *